(12) United States Patent
Aso et al.

(10) Patent No.: US 8,223,520 B2
(45) Date of Patent: Jul. 17, 2012

(54) DC CONVERSION APPARATUS

(75) Inventors: Shinji Aso, Niiza (JP); Yukihiro Kaminaga, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 480 days.

(21) Appl. No.: 12/375,420

(22) PCT Filed: Jan. 31, 2008

(86) PCT No.: PCT/JP2008/051547
§ 371 (c)(1),
(2), (4) Date: Jan. 28, 2009

(87) PCT Pub. No.: WO2008/099683
PCT Pub. Date: Aug. 21, 2008

(65) Prior Publication Data
US 2009/0201700 A1    Aug. 13, 2009

(30) Foreign Application Priority Data
Feb. 16, 2007  (JP) .................................. 2007-036527

(51) Int. Cl.
*H02M 3/335* (2006.01)
(52) U.S. Cl. ......................................................... 363/97
(58) Field of Classification Search .................... 363/15, 363/16, 20, 21.01, 21.02, 21.04, 21.12, 95, 363/97, 131
See application file for complete search history.

(56) References Cited

U.S. PATENT DOCUMENTS

| | | | | |
|---|---|---|---|---|
| 4,742,441 A | * | 5/1988 | Akerson | 363/97 |
| 4,809,151 A | | 2/1989 | Ota | |
| 4,825,348 A | * | 4/1989 | Steigerwald et al. | 363/17 |
| 5,412,305 A | * | 5/1995 | Jeanneret | 320/119 |
| 5,448,465 A | * | 9/1995 | Yoshida et al. | 363/15 |
| 5,994,793 A | * | 11/1999 | Bobry | 307/64 |
| 6,205,036 B1 | * | 3/2001 | Anzawa | 363/20 |
| 7,589,980 B2 | * | 9/2009 | Aso | 363/17 |
| 7,944,085 B2 | * | 5/2011 | Kyono | 307/31 |
| 2008/0239768 A1 | | 10/2008 | Aso | |
| 2008/0285311 A1 | | 11/2008 | Aso | |

FOREIGN PATENT DOCUMENTS

| | | |
|---|---|---|
| CN | 1417933 A | 5/2003 |
| JP | 62 196071 | 8/1987 |
| JP | 9 322533 | 12/1997 |
| JP | 2003 319650 | 11/2003 |
| JP | 2006 94585 | 4/2006 |

OTHER PUBLICATIONS

U.S. Appl. No. 12/682,623, filed Apr. 12/2010, Aso.

* cited by examiner

*Primary Examiner* — Adolf Berhane
(74) *Attorney, Agent, or Firm* — Oblon, Spivak, McClelland, Maier & Neustadt, L.L.P.

(57) ABSTRACT

A DC conversion apparatus comprises a first transformer, a second transformer, a parallel circuit having series circuits connected in parallel, one of the series circuits including a reactor and a primary winding of the first transformer, the other series circuit including a reactor and a primary winding of the second transformer, a conversion circuit converting a DC voltage of a DC power source into an AC voltage and outputting it to the parallel circuit, a first rectifying-smoothing circuit rectifying and smoothing a first voltage generated by a first secondary windings of the first transformer into a first DC output, and a second rectifying-smoothing circuit rectifying and smoothing a second voltage generated by a first secondary windings of the second transformer into a second DC output that is different from the first voltage. The second secondary windings of the first transformer are connected in parallel with the first secondary windings of the second transformer.

10 Claims, 10 Drawing Sheets

DC CONVERSION APPARATUS

TECHNICAL FIELD

The present invention relates to a DC conversion apparatus that is highly efficient, small, and inexpensive.

BACKGROUND TECHNOLOGY

Figure 1:
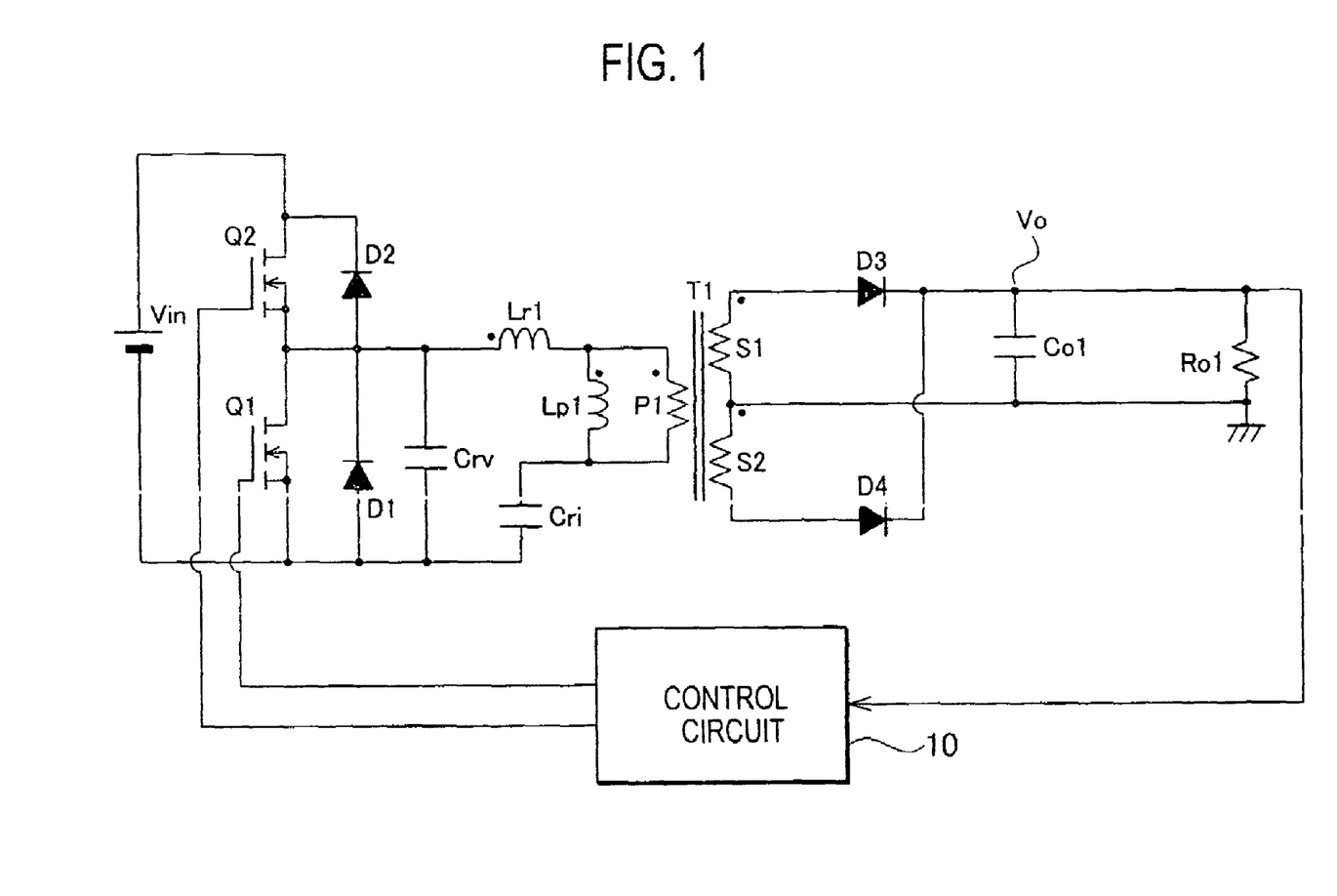
FIG. 1 is a circuit diagram illustrating a single-output DC conversion apparatus according to a related art.
Figure 2:
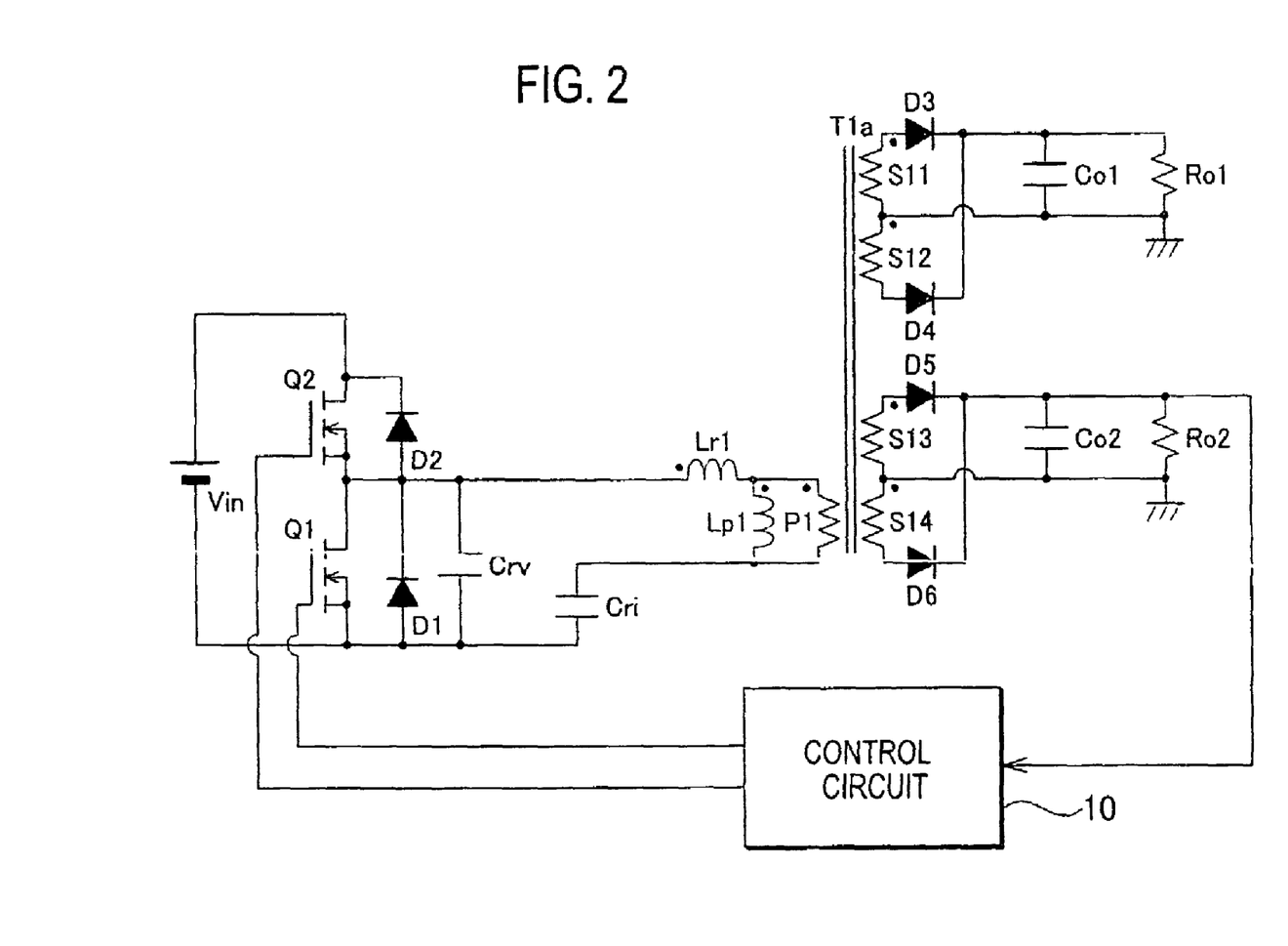
FIG. 2 is a circuit diagram illustrating a multiple-output DC conversion apparatus according to a related art.

FIG. 2 illustrates a circuit configuration of a multiple-output DC conversion apparatus according to a related art. FIG. 1 illustrates, as an example of a basic circuit to explain the multiple-output DC conversion apparatus, a circuit configuration of a single-output DC conversion apparatus disclosed in Japanese Unexamined Patent Application Publication No. 2003-319650.

The DC conversion apparatus illustrated in FIG. 1 consists of a half-bridge circuit. Ends of a DC power source Mm are connected to a series circuit that includes a switching element Q1 made of a MOSFET and a switching element Q2 made of a MOSFET. A drain of the switching element Q2 is connected to a positive electrode of the DC power source Mm and a source of the switching element Q1 is connected to a negative electrode of the DC power source Vin.

Between the drain and source of the switching element Q1, there are connected a diode D1 and a voltage resonant capacitor Crv that are connected in parallel, as well as a series circuit including a reactor Lr1, a primary winding P1 of a transformer T1, and a current resonant capacitor Cri. The reactor Lr1 is a leakage inductance between the primary and secondary sides of the transformer T1. The primary winding P1 is connected to an equivalent reactor Lp1 which is an exciting inductance. Between the drain and source of the switching element Q2, there is connected a diode D2 in parallel.

A winding start of each winding of the transformer T1 is depicted by a filled circle. A first end (with a filled circle) of a secondary winding S1 of the transformer T1 is connected to an anode of a diode D3. A second end of the secondary winding S1 of the transformer T1 and a first end (with a filled circle) of a secondary winding S2 of the transformer T1 are connected to a first end of a smoothing capacitor Co1. A second end of the secondary winding S2 of the transformer T1 is connected to an anode of a diode D4. A cathode of the diode D3 and a cathode of the diode D4 are connected to a second end of the capacitor Co1. The ends of the capacitor Co1 are connected to a load Ro1.

A control circuit 10 alternately turns on/off the switching elements Q1 and Q2 according to an output voltage Vo from the capacitor Co1, to carry out PFM control (frequency control) so that the output voltage Vo from the capacitor Co1 is kept constant.

Operation of the DC conversion apparatus with the above-mentioned configuration will be explained in detail with reference to a timing chart illustrated in FIG. 4.

Figure 4:
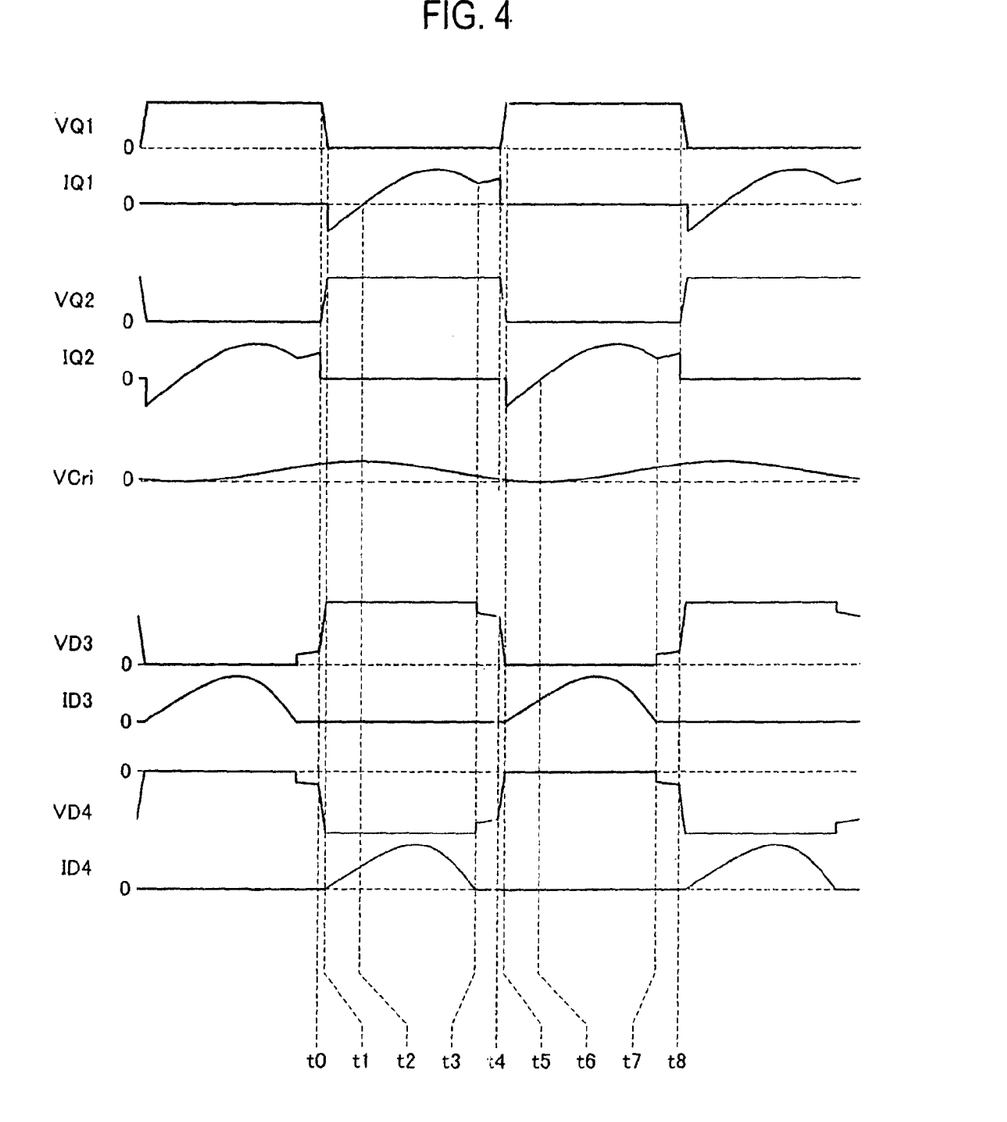
FIG. 4 is a timing chart illustrating signals at various parts of the single-output DC conversion apparatus according to the related art of FIG. 1.

In FIG. 4, VQ1 is a drain-source voltage of the switching element Q1, IQ1 is a drain current of the switching element Q1, VQ2 is a drain-source voltage of the switching element Q2, IQ2 is a drain current of the switching element Q2, VCri is a terminal voltage of the current resonant capacitor Cri, VD3 is a terminal voltage of the diode D3, ID3 is a current of the diode D3, VD4 is a terminal voltage of the diode D4, and ID4 is a current of the diode D4.

There is a dead time during which the switching elements Q1 and Q2 are both OFF. The switching elements Q1 and Q2 are alternately turned on/off.

In an interval between t0 and t1, the switching element Q2 changes from ON to OFF at t0. In a state where the switching element Q2 is ON, the primary side of the transformer T1 passes a current in a clockwise direction through a path extending along Vin, Q2, Lr1, Lp1, Cri, and Vin and the secondary side of the transformer T1 passes a current through a path extending along Co1, Ro1, and Co1.

When the switching element Q2 turns off, the current of the primary side of the transformer T1 shifts from the switching element Q2 to the voltage resonant capacitor Crv and passes in a clockwise direction through a path extending along Crv, Lr1, Lp1, Cri, and Crv.

As a result, the voltage resonant capacitor Crv, which substantially has the voltage of the DC power source Vin in the state where the switching element Q2 is ON, discharges to 0 V (hereinafter, the voltage of the DC power source Vin is also represented with Vin).

Since the voltage of the voltage resonant capacitor Crv is equal to the voltage VQ1 of the switching element Q1, the voltage VQ1 of the switching element Q1 decreases from Vin to 0 V. The voltage VQ2 of the switching element Q2 is (Vin−VQ1), and therefore, increases from 0 V to Vin.

In an interval from t1 to t2, the voltage of the voltage resonant capacitor Crv decreases to 0 V at t1 and the diode D1 becomes conductive to pass a current in a clockwise direction through a path extending along D1, Lr1, Lp1 (P1), Cr1, and D1. The voltage of the secondary winding S2 of the transformer T1 reaches the output voltage Vo, and on the secondary side of the transformer T1, currents pass through the path extending along Co1, Ro1, and Co1 and a path extending along S2, D4, Co1, and S2. In the interval from t1 to t2, a gate signal to the switching element Q1 is set to ON so that the switching element Q1 conducts a zero-voltage switching (ZVS) operation and a zero-current switching (ZCS) operation.

In an interval from t2 to t3, the switching element Q1 is ON at t2 to pass a current in a counterclockwise direction through a path extending along Cri, Lp1 (P1), Lr1, Q1, and Cri, so that the voltage VCri of the current resonant capacitor Cri decreases. On the secondary side of the transformer T1, currents pass through the path extending along S2, D4, Co1, and S2 and the path extending along Co1, Ro1, and Co1. The voltage of the secondary winding S2 is clamped at the output voltage Vo and the voltage of the primary winding P1 is clamped at a voltage determined by the output voltage Vo and a turn ratio, so that the primary side of the transformer T1 passes a resonant current produced by the reactor Lr1 and current resonant capacitor Cri.

In an interval from t3 to t4, the voltage of the secondary winding S2 becomes lower than the output voltage Vo at t3 and the current on the secondary side of the transformer T1 becomes nil. On the secondary side of the transformer T1, a current passes through the path extending along Co1, Ro1, and Co1 in a clock wise manner. On the primary side of the transformer T1, a current passes in a counterclockwise direction through the path extending along Cri, Lp1, Lr1, Q1, and Cri. On the primary side of the transformer T1, a resonant current determined by the sum (Lr1+Lp1) of the two reactors Lr1 and Lp1 and the current resonant capacitor Cri are caused.

In an interval from t4 to t5, the switching element Q1 turns off at t4 and the current of the primary side of the transformer T1 shifts from the switching element Q1 to the voltage resonant capacitor Crv and passes in a counterclockwise direction through a path extending along Lp1, Lr1, Crv, Cri, and Lp1.

Accordingly, the voltage resonant capacitor Crv, which is about 0 V in the state in which the switching element Q1 is ON, is charged to Vin. Since the voltage of the voltage resonant capacitor Crv is equal to the voltage VQ1 of the switching element Q1, the voltage of the switching element Q1 increases from 0 V to Vin. The voltage VQ2 of the switching element Q2 is (Vin−VQ1), and therefore, decreases from Vin to 0 V.

In an interval from t5 to t6, the voltage of the voltage resonant capacitor Crv increases to Vin at t5 and the diode D2 becomes conductive to pass a current in a counterclockwise direction through a path extending along Lp1 (P1), Lr1, D2, Vin, Cri, and Lp1 (P1). Also, the voltage of the secondary winding S1 of the transformer T1 reaches the output voltage Vo, and on the secondary side of the transformer T1, currents pass through the path extending along Co1, Ro1, and Co1 and a path extending along S1, D3, Co1, and S1. In the interval from t5 to t6, a gate signal to the switching element Q2 is set to ON, so that the switching element Q2 conducts a zero-voltage switching operation and a zero-current switching operation.

In an interval from t6 to t7, the switching element Q2 turns on at t6 to pass a current in a clockwise direction through a path extending along Vin, Q2, Lr1, Lp1 (P1), Cri, and Vin and increase the voltage VCri of the current resonant capacitor Cri. On the secondary side of the transformer T1, currents pass through the path extending along S1, D3, Co1, and S1 and the path extending along Co1, Ro1, and Co1. The voltage of the secondary winding S1 is clamped at the output voltage Vo and the voltage of the primary winding P1 is clamped at a voltage determined by the output voltage Vo and a turn ratio. As a result, the primary side of the transformer T1 passes a resonant current produced by the reactor Lr1 and current resonant capacitor Cri.

In an interval from t7 to t8, the voltage of the secondary winding S1 becomes lower than the output voltage Vo at t7, and on the secondary side of the transformer T1, a current passes through the path extending along Co1, Ro1, and Co1. On the primary side of the transformer T1, a current passes in a clockwise direction through the path extending along Vin, Q2, Lr1, Lp1, Cri, and Vin. On the primary side of the transformer T1, a resonant current produced by the sum (Lr1+Lp1) of the two reactors Lr1 and Lp1 and the current resonant capacitor Cri are caused.

In this way, the DC conversion apparatus according to the related art illustrated in FIG. 1 employs a pulse signal having a duty of about 50% to control the switching frequency of the switching elements Q1 and Q2 and change the resonant current produced by the reactors Lr1 and Lp1 and current resonant capacitor Cri, thereby controlling the output voltage Vo. Namely, increasing the switching frequency results in decreasing the output voltage Vo.

The output smoothing means of the circuit illustrated in FIG. 1 is of a capacitor input type. To configure the secondary side of the transformer T1 so as to provide multiple outputs, secondary windings S11 and S12 are added to secondary windings S13 and S14 of a transformer T1a as illustrated in FIG. 2 and a voltage of the secondary windings S11 and S12 is rectified and smoothed. This may simply realize a multiple-output power source circuit. The secondary windings S11 and S12 and the secondary windings S13 and S14 are tightly coupled, and therefore, each output voltage is provided in proportion to a turn ratio, to achieve a proper cross regulation.

As mentioned above, the output voltage Vo on the secondary side of the transformer T1 is a voltage proportional to the number of turn, on secondary side, and therefore, the larger the number of turns on the secondary side of the transformer T1, the finer the output voltage is set.

DISCLOSURE OF INVENTION

However, increasing the number of turns of a secondary winding enlarges the resistance value of the secondary winding, to increase a copper loss. Accordingly, a standard transformer design for providing large output power increases the sectional area of a core of a transformer and reduces the number of turns on the secondary side, thereby substantially equalizing a core loss and a winding loss.

Figure 3:
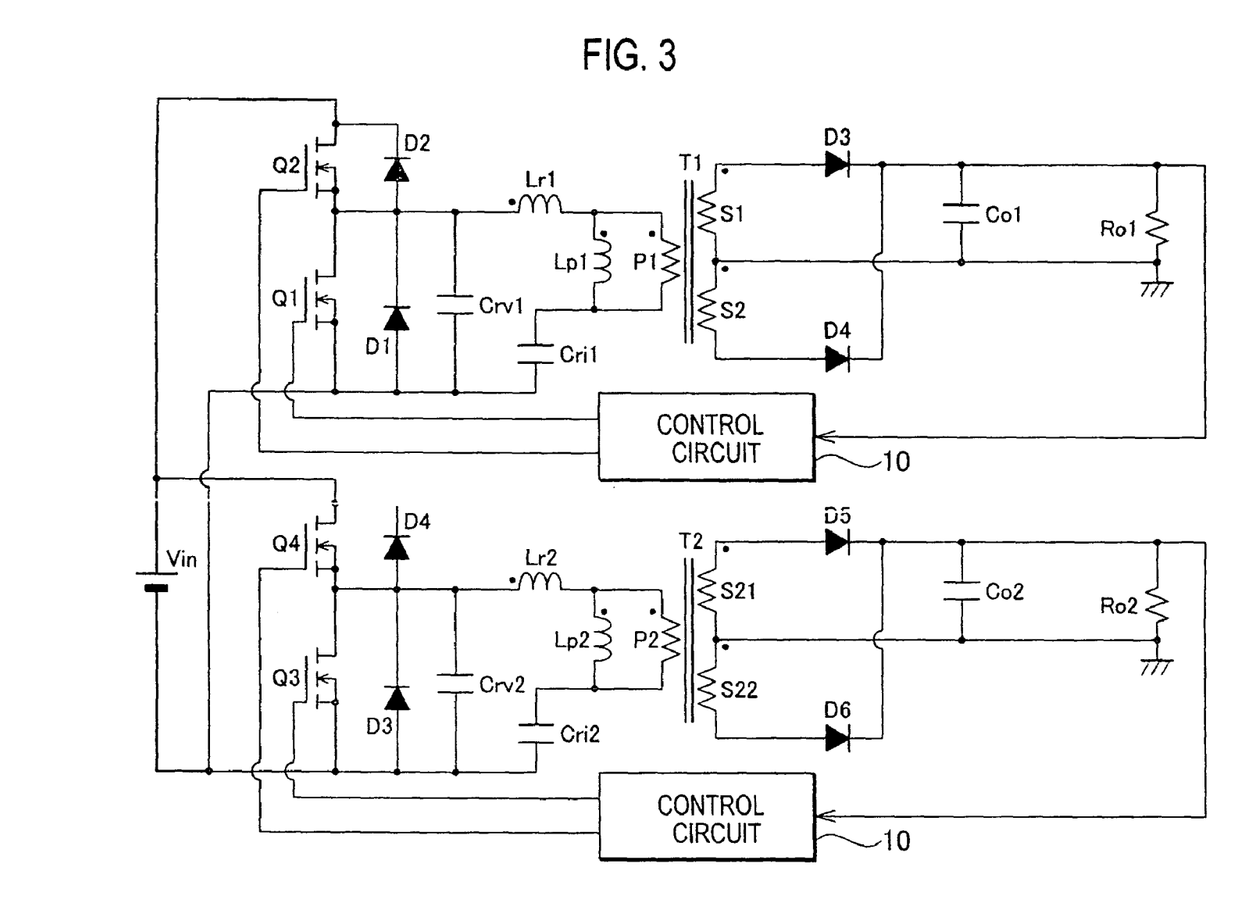
FIG. 3 is a circuit diagram illustrating another multiple-output DC conversion apparatus according to a related art.

In this case, an output voltage will not finely be regulated if output power is large. Then, the two secondary windings of the transformer illustrated in FIG. 2 hardly provide required two output voltages proportional to turn ratios, and as illustrated in FIG. 3, two converters must be arranged, i.e., a first converter including switching elements Q1 and Q2 and a transformer T1 and a second converter including switching elements Q3 and Q4 and a transformer T2.

When the number of turns of a secondary winding is increased, a primary winding must be increased accordingly. And when the reactor Lr1 forming a resonant circuit is a leakage inductance between the primary and secondary windings of the transformer T1, the below-mentioned problems will arise.

Namely, increasing the primary winding of the transformer T1 results in increasing the leakage inductance in proportion to a square of the number of turns. Power to be sent to the secondary side of the transformer T1 is proportional to a square root of Cri/Lr1 and an operating frequency is proportional to Cri×Lr1.

When the operating frequency is fixed, the output voltage is proportional to the current resonant capacitor Cri. To constitute a power source circuit having a large output capacity, the current resonant capacitor Cri must be enlarged. When the operating frequency is fixed, the reactor Lr1 must be reduced as the current resonant capacitor Cri is enlarged. To reduce the reactor Lr1, the primary winding must be reduced. Namely, increasing the output power of a power source circuit results in reducing a secondary winding, to make it difficult to precisely select a turn ratio on the secondary side. For this, the two-converter configuration illustrated in FIG. 3 is needed, which, however, increase cost.

In this way, to achieve multiple outputs including a low output voltage, the related art must employ a small number of turns for the low output voltage. Namely, the related art hardly realizes multiple outputs including a low output voltage. The related art may realize multiple outputs with a large number of turns. This, however, needs a large transformer having a large copper loss. In addition, the related art must operate at low operating frequencies, and therefore, must have a large resonant capacitor for a resonant circuit and a large smoothing capacitor on the secondary side. Further, the operating frequencies come in an audible frequency range, and therefore, the related art is impractical.

According to the present invention, a DC conversion apparatus that is small, inexpensive, and highly efficient can be provided.

Means to Solve the Problems

According to a first technical aspect of the present invention provided is a DC conversion apparatus comprising a first transformer at least having a primary winding, a first secondary winding, and a second secondary winding, a second transformer at least having a primary winding and a first secondary winding, a parallel circuit having first and second series circuits connected in parallel, the first series circuit including a first reactor and the primary winding of the first transformer those are connected in series, the second series circuit including a second reactor and the primary winding of the second transformer that are connected in series, a conversion circuit converting a DC voltage of a DC power source into an AC voltage and outputting the AC voltage to the parallel circuit, a first rectifying-smoothing circuit rectifying and smoothing a first voltage generated by the first secondary winding of the first transformer into a first DC output, and a second rectifying-smoothing circuit rectifying and smoothing a second voltage generated by the first secondary winding of the second transformer into a second DC output, the second voltage being different from the first voltage. The second secondary winding of the first transformer is connected in parallel with the first secondary winding of the second transformer.

A second technical aspect of the present invention provides a DC conversion apparatus comprising a first transformer at least having a primary winding, a first secondary winding, and a second secondary winding, a second transformer at least having a primary winding, a first secondary winding, and a second secondary winding, a parallel circuit having first and second series circuits connected in parallel, the first series circuit including a first reactor and the primary winding of the first transformer those are connected in series, the second series circuit including a second reactor and the primary winding of the second transformer those are connected in series, a conversion circuit converting a DC voltage of a DC power source into an AC voltage and outputting the AC voltage to the parallel circuit, a first rectifying-smoothing circuit rectifying and smoothing a first voltage generated by the first secondary winding of the first transformer into a first DC output, and a second rectifying-smoothing circuit rectifying and smoothing a second voltage generated by the first secondary winding of the second transformer into a second DC output, the second voltage being different from the first voltage. The second secondary winding of the first transformer is connected in parallel with the second secondary winding of the second transformer.

According to a third technical aspect of the present invention that is based on the first and second technical aspects, the first reactor comprises a leakage inductance of the first transformer and the second reactor comprises a leakage inductance of the second transformer.

According to a fourth technical aspect of lie present invention that is based on the first to third technical aspects, the conversion circuit comprises a first switching element having a first end connected to a negative electrode of the DC power source and a second switching element having a first end connected to a second end of the first switching element and a second end connected to a positive electrode of the DC power source. The conversion circuit alternately turns on/off the first and second switching elements configured to convert a DC voltage of the DC power source into an AC voltage and outputs the AC voltage to the parallel circuit through a current resonant capacitor connected to the first end of the first switching element, the second end of the second switching element, or a connection point of the first and second switching elements.

According to a fifth technical aspect of the present invention that is based on the first to third technical aspects, the conversion circuit comprises a first switching element having a first end connected to a negative electrode of the DC power source and a second switching element having a first end connected to a second end of the first switching element and a second end connected through a clamp capacitor to the negative or positive electrode of the DC power source. The conversion circuit alternately turns on/off the first and second switching elements configured to convert a DC voltage of the DC power source into an AC voltage and outputs the AC voltage to the parallel circuit.

According to a sixth technical aspect of the present invention that is based on the first to fifth technical aspects, the first and second rectifying-smoothing circuits have each a rectifying diode and a smoothing capacitor, to full-wave or half-wave rectify and smooth the first and second voltages into the first and second DC outputs.

BEST MODE OF IMPLEMENTING INVENTION

DC conversion apparatuses according to embodiments of the present invention will be explained in detail with reference to the drawings.

Embodiment 1

Figure 5:
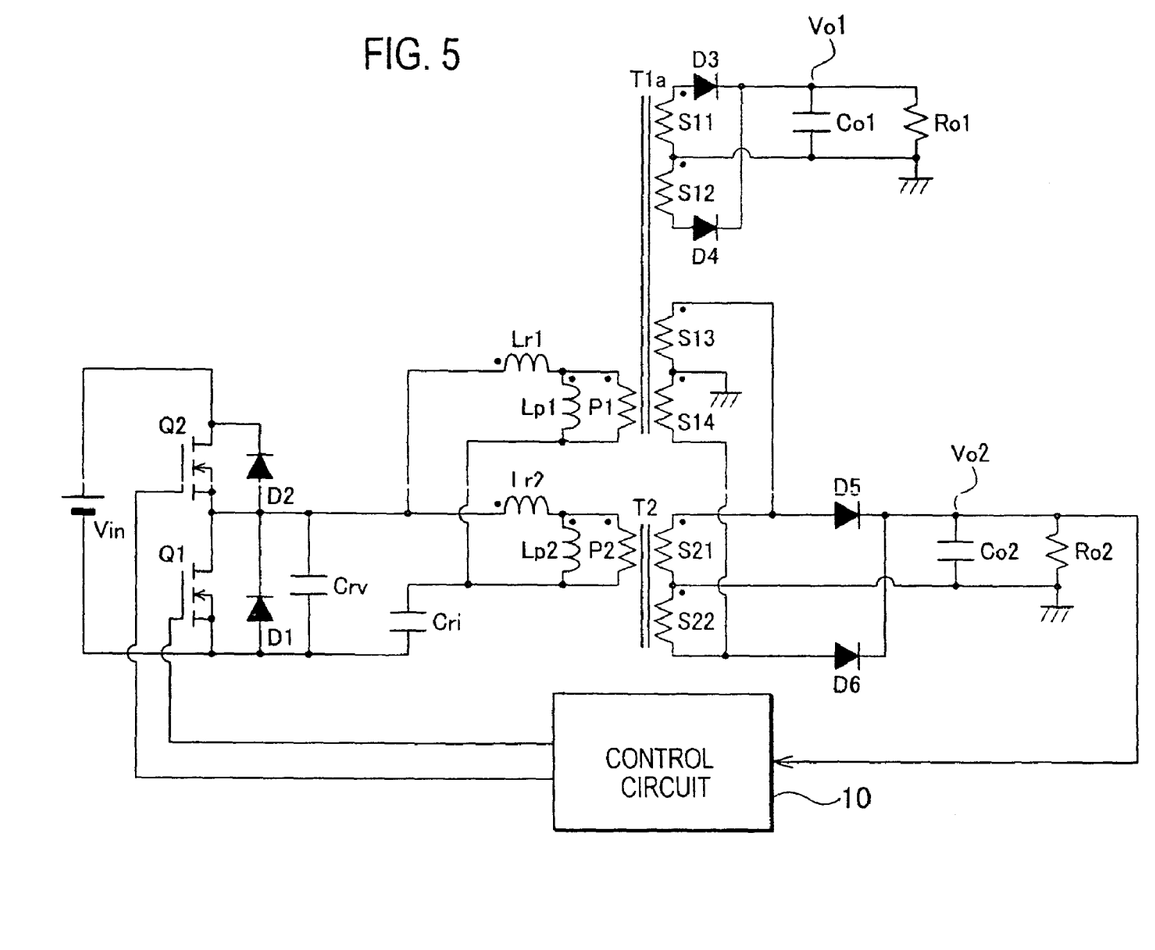
FIG. 5 is a circuit diagram illustrating a DC conversion apparatus according to Embodiment 1 of the present invention.

FIG. 5 is a circuit diagram illustrating a DC conversion apparatus according to Embodiment 1 of the present invention. The DC conversion apparatus of Embodiment 1 illustrated in FIG. 5 has a half-bridge circuit like the DC conversion apparatus as illustrated in FIG. 1.

A transformer (first transformer) T1$a$ at least has a primary winding P1, first secondary windings S11 and S12, and second secondary Bindings S13 and S14. The first secondary windings S11 and S12 and the second secondary windings S13 and S14 are connected in series.

A transformer (second transformer) 12 at least has a primary winding P2 and first secondary windings S21 and S22. The first secondary windings S21 and S22 are connected in series.

The primary winding P1 of the transformer T1$a$ and a reactor (first reactor) Lr1 form a series circuit (first series circuit), and the primary winding P2 of the transformer f2 and a reactor (second reactor) Lr2 form a series circuit (second series circuit). These series circuits are connected in parallel to form a parallel circuit. The parallel circuit and a current resonant capacitor Cri form a series circuit. This series circuit and a voltage resonant capacitor Crv are connected between the drain and source of a switching element (first switching element) Q1 made of a MOSFET. A switching element (second switching element) Q2 made of a MOSFET and the switching element Q1 are connected in series and are connected to ends of a DC power source Vin. Between the drain and source of the switching element Q1, a diode D1 is connected, and between the drain and source of the switching element Q2, a diode D2 is connected. The series circuit consisting of the parallel circuit and current resonant capacitor Cri and the voltage resonant capacitor Crv may be connected between the drain and source of the switching element Q2. The diodes D1 and D2 may be parasitic diodes between the drain and source of each of the switching elements Q1 and Q2. The voltage resonant capacitor Crv may be a parasitic capacitance between the drain and source of each of the switching elements Q1 and Q2.

The reactor Lr1 is a leakage inductance formed between the primary and secondary sides of the transformer T1a. The primary winding P1 is connected to an excitation inductance serving as an equivalent reactor Lp1. The reactor Lr2 is a leakage inductance formed between the primary and secondary sides of the transformer T2. The primary winding P2 is connected to an excitation inductance serving as an equivalent reactor Lp2.

The switching elements Q1 and Q2 Form a conversion circuit The switching elements Q1 and Q2 are alternately turned on/off to convert a DC voltage of the DC power source Mm into an AC voltage. The AC voltage is supplied to the primary windings P1 and P2 in the parallel circuit through the current resonant capacitor Cri connected to the source of the switching element Q1 and through the reactors Lr1 and Lr2. The conversion circuit may include the current resonant capacitor Cri. The current resonant capacitor Cri may be connected to the drain of the switching element Q1.

A first end of the first secondary winding S11 of the transformer T1a as depicted by a filled circle is connected to an anode of a diode D3. A second end of the first secondary winding S11 of the transformer T1a and a first end (with a filled circle) of the first secondary winding S12 of the transformer T1a are connected to a first end of a smoothing capacitor Co1. A second end of the first secondary winding S12 of the transformer T1a is connected to an anode of a diode D4. A cathode of the diode D3 and a cathode of the diode D4 are connected to a second end of the capacitor Co1. The ends of the capacitor Co1 are connected to a load Ro1. The diodes D3 and D4 and capacitor Co1 form a first rectifying-smoothing circuit that rectifies and smoothes a voltage (first voltage) generated by the first secondary windings S11 and S12 into a first DC voltage Vo1.

A first end of the first secondary winding S21 of the transformer T2 as depicted by a filled circle is connected to an anode of a diode D5. A second end of the first secondary winding S21 of the transformer T2 and a first end (with a filled circle) of the first secondary winding S22 of the transformer T2 are connected to a first end of a smoothing capacitor Co2. A second end of the first secondary winding S22 of the transformer T2 is connected to an anode of a diode D6. A cathode of the diode D5 and a cathode of the diode D6 are connected to a second end of the capacitor Co2. The ends of the capacitor Co2 are connected to a load Ro2. The diodes D5 and D6 and capacitor Co2 form a second rectifying-smoothing circuit that rectifies and smoothes a voltage (second voltage) generated by the first secondary windings S21 and S22 into a second DC output Vo2.

The second secondary windings S13 and S14 of the transformer T1a are connected in series and a connection point of the second secondary windings S13 and S14 is grounded. A first end (with a filled circle) of the second secondary winding S13 of the transformer T1a is connected to the first end (with a filled circle) of the first secondary winding S21 of the transformer T2. A second end of the second secondary winding S14 of the transformer T1a is connected to the second end of the first secondary winding S22 of the transformer T2. Namely, the second secondary windings S13 and S14 of the transformer T1a are connected in parallel with the first secondary windings S21 and S22 of the transformer T2 and are coupled with the first secondary windings S21 and S22 of the transformer T2.

A control circuit 10 alternately turns on/off the switching elements Q1 and Q2 according to the output voltage Vo2 from the capacitor Co2, to carry out PFM control (frequency control) so that the output voltage Vo2 of the capacitor Co2 is kept constant.

Operational waveforms of FIG. 5 are basically the same as those of the related art illustrated in FIG. 1, and therefore, an explanation of the operation is omitted.

The numbers of turns of the primary windings P1 and P2 are different and the numbers of turns of the secondary windings S11 to S14, S21, and S22 are different. In the transformers T1a and T2, the primary windings P1 and P2 are connected in parallel and the secondary windings S13 and S14 and the secondary windings S21 and S22 are connected in parallel. This configuration precisely provides different output voltages from the transformers T1a and l according to turn ratios. This will be explained.

In FIG. 5, power of, for example, 5 V and 10 A, i.e., 50 W is supplied to the load Ro1 and power of 24V and 10 A, i.e., 240 W is supplied to the load Ro2. This example will be explained. An output voltage is proportional to a turn ratio, and therefore, a winding voltage for 5-volt output is 5.5 V in consideration of a forward voltage Vf1 of the rectifying diodes D3 and D4 of 0.5 V.

A winding voltage for 24-volt output must be 24.7 V in consideration of a forward voltage Vf2 of the rectifying diodes D5 and D6 of 0.7 V. Accordingly, a turn ratio that minimizes the 5-volt winding and 24-volt winding is 2:9. As a result, the number of turns of the secondary windings S11 and S12, i.e., 5-volt winding is 2 T (turns) and that of the secondary windings S13 and S14, i.e., 24-volt winding is 9 T (turns).

The number of turns of the primary winding P1 is, with a maximum power source voltage value of the DC power source Vin being 400 V, expressed by relationships of P1>S11·(Vin/2)/(Vo+Vf)=72.7 T and P1=73 T (turns).

If the switching elements Q1 and Q2 have an operating frequency f of 100 kHz, a sectional area Ae1 of a core of the transformer T1a is obtained from a secondary winding voltage Vs as $Ae_1=Vs/(2·\Delta B·S11·f)=46$ [mm$^2$] with a magnetic flux density ΔB of 300 [mT] (millitesla). This corresponds to a sectional core area of EI25 standard. Generally, the core of EI25 forms a transformer of about 70 W.

Accordingly, the transformer T1a rated by 5 V and 10 A is realized with a core having a sectional core area corresponding to EI25, the primary winding P1 of 73 T, and the secondary windings S11 and S12 of 2 T.

When the reactor Lr1 forming a resonant circuit is a leakage inductance between the primary winding P1 and secondary windings S11 to S14 of the transformer T1a, the primary winding P1 and secondary windings S11 to S14 may loosely be coupled to take the reactor Lr1 into the transformer T1a.

Since the power of 24 V and 10 A is 240 W, it is difficult to form the transformer T2 with a core corresponding to EI25. If the core corresponding to EI25 is used to provide an output capacity larger than 70 W, a copper loss becomes very large to unbalance the copper loss and iron loss of the transformer. A larger transformer is needed. Accordingly, for a rating of 24 V and 10 A, i.e., 240 W, the number of turns of the 24-volt winding must be reduced to reduce the copper loss.

If the number of turns of the 24-volt winding is made to, for example, 3 T, a sectional area $Ae_2$ of the core of the transformer T2 becomes $Ae_2=Vs/(2 \cdot \Delta B \cdot S21 \cdot f)$ 137 [mm²], which corresponds to EI40.

Generally, the core of EI40 provides power of about 350 W, and therefore, is sufficient to secure power rated by 24 V and 10 A. With the use of the core corresponding to EI40, the number of turns of the secondary windings S21 and S22 may be 3 T. In this case, the number of turns of the primary winding P2 is expressed by relationships of P2>S21 (Vin/2)/(Vo+Vf)=24.3 T and P2=25 T.

Accordingly, a multiple-output power source circuit of 5 V-10 A and 24 V-10 A can be formed with the circuit of FIG. 5 if the transformer T2 has the core having a sectional core area corresponding to EI40, the primary winding P2 of 25 T, and the secondary windings S21 and S22 of 3 T.

If the reactor Lr2 of a resonant circuit is a leakage inductance between the primary winding P2 and the secondary windings S21 and 822 of the transformer T2, the primary winding P2 and the secondary windings S21 and S22 may loosely be coupled to take the reactor Lr2 into the transformer T2.

Since the number of turns of the 5-volt winding, i.e., the secondary windings S11 and S12 of the transformer T1a is 2 T, the number of turns of the secondary windings S13 and S14 of the transformer T1a is 9 T. The voltage of the secondary windings S13 and S14 of 9 T is equal to the voltage of the secondary windings S21 and S22 serving as the 24-volt winding having the number of turns of 3 T of the transformer T2, and therefore, 5 V and 24 V can always be output as voltages proportional to the numbers of turns.

The present embodiment as illustrated in FIG. 5 detects the output voltage Vo2 of the capacitor Co2, and according to the detected voltage, the control circuit 10 controls the switching elements Q1 and Q2. If the output voltage Vo2 of the capacitor Co2 is 24V, the voltage (second voltage) of the first secondary windings S21 and S22 of the transformer T2 is 24.7 V with a forward voltage of the diodes D5 and D6 being 0.7 V. Accordingly, the voltage of 24.7 V is also applied to the second secondary windings S13 and S14 of the transformer T1a.

Therefore, the voltage (first voltage) of the first secondary windings S11 and S12 of the transformer T1a is always 24.7V/(9 T/2 T)=549V. If a forward voltage of the diodes D3 and D4 is 0.5 V, the output voltage Vo1 of the capacitor Co1 is always 4.99 V.

The secondary windings S13 and S14 and the secondary windings S21 and S22 are connected in parallel, and the primary windings P11 and P2 are connected in parallel. This causes a large circulation current due to a turn ratio difference, in general. Since the primary windings P1 and P2 are connected to the reactors Lr1 and Lr2 in series, respectively, the circulation current due to the turn ratio difference becomes very small.

The turn ratio between the primary winding P1 and the second secondary windings S13 and S14 (24 V and 9 T) of the transformer T1a is 73:9 because the number of turns of the primary winding P1 is 73 T. This turn ratio of 73:9 is equal to 8.111:1 with the second secondary windings S13 and S14 being 1. The number of turns of the first secondary windings S21 and S22 of the transformer T2 is 3 T and that of the primary winding P2 is 25 T, to provide 25:3=8.333:1.

Generally, connecting the primary and secondary windings of transformers in parallel causes a circulation current due to a slight difference between the numbers of turns. According to the present embodiment, the primary windings P1 and P2 are connected to the reactors Lr1 and Lr2 in series and these series circuits are connected in parallel. This enables the second secondary windings S13 and S14 of the transformer T1a to be connected in parallel with the first secondary windings S21 and S22 of the transformer T2 whose core size differs from that of the transformer T1a.

In this way, the DC conversion apparatus of the present embodiment connects in parallel the primary windings P1 and P2 of the transformers T1a and T2 having the primary windings P1 and P2 and secondary windings S11 to S14, S21, and S22 of different numbers of turns and connects in parallel at least the secondary winding S13, S14, S21, and S22 among the secondary windings S11 to S14, S21, and S22 of the transformers T1a and T2, so that the parallel-connected secondary winding S13, S14, S21, and S22 have a fixed voltage value. When the transformers T1a and T2 are used, the secondary windings S11 to S14, S21, and S22 provide voltages proportional to the turn ratios of the secondary windings of the transformers T1a and T2. The voltages of the parallel-connected secondary windings S13, S14, S21, and S22 are coupled together, so that the voltages of the transformers T1a and T2 are correctly provided as voltages determined by the turn ratios. The secondary windings S81 and S12 and the secondary windings S21 and S22 are connected to the first and second rectifying-smoothing circuits, respectively, to constitute a multiple-output power source circuit capable of including a low-voltage output with a single converter. Accordingly, this multiple-output DC conversion apparatus becomes compact, inexpensive, and highly efficient.

Embodiment 2

Figure 6:
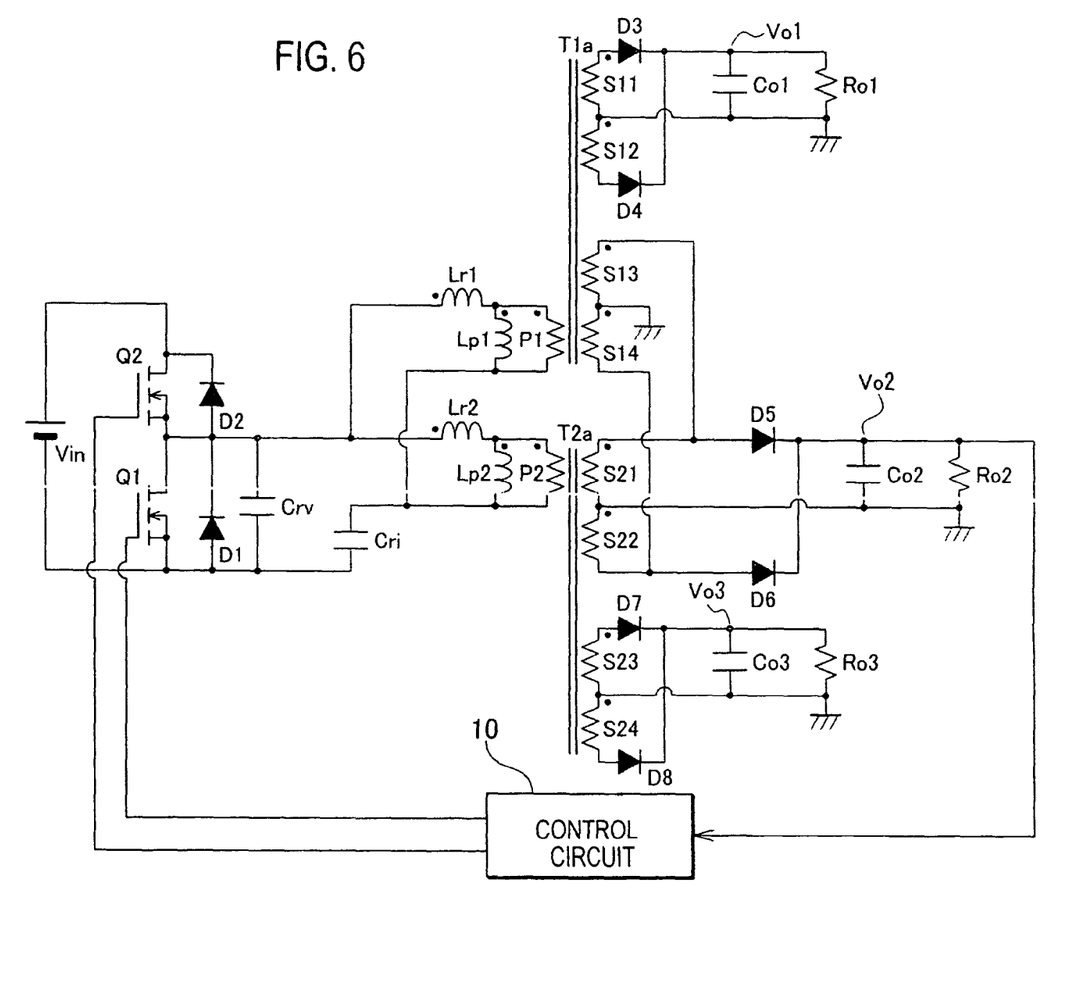
FIG. 6 is a circuit diagram illustrating a DC conversion apparatus according to Embodiment 2 of the present invention.

FIG. 6 is a circuit diagram illustrating a DC conversion apparatus according to Embodiment 2 of the present invention. The present embodiment as illustrated in FIG. 6 employs a transformer t2a having secondary windings S23 and S24 in addition to the transformer T2 of the DC conversion apparatus of Embodiment 1 as illustrated in FIG. 5, to realize three outputs. The other parts of the configuration illustrated in FIG. 6 are the same as those of the DC conversion apparatus of Embodiment 1 as illustrated in FIG. 5, and therefore, the same parts are represented with the same reference marks.

A first end of the secondary winding S23 of the transformer T2a as depicted by a filled circle is connected to an anode of a diode D7. A second end of the secondary winding S23 of the transformer T2a and a first end (with a filled circle) of the secondary winding S24 of the transformer T2a are connected to a first end of a smoothing capacitor Co3. A second end of the secondary winding S24 of the transformer 12a is connected to an anode of a diode D8. A cathode of the diode D7 and a cathode of the diode D8 are connected to a second end of the capacitor Co3. The ends of the capacitor Co3 are connected to a load Ro3. The diodes D7 and D8 and capacitor Co3 form a third rectifying-smoothing circuit to rectify and smooth a voltage generated by the secondary windings S23 and S24 into a third DC output Vo3.

The above-mentioned configuration realizes tile effect of Embodiment 1 and is capable of providing three outputs, i.e., the first to third DC outputs Vo1 to Vo3.

Embodiment 3

Figure 7:
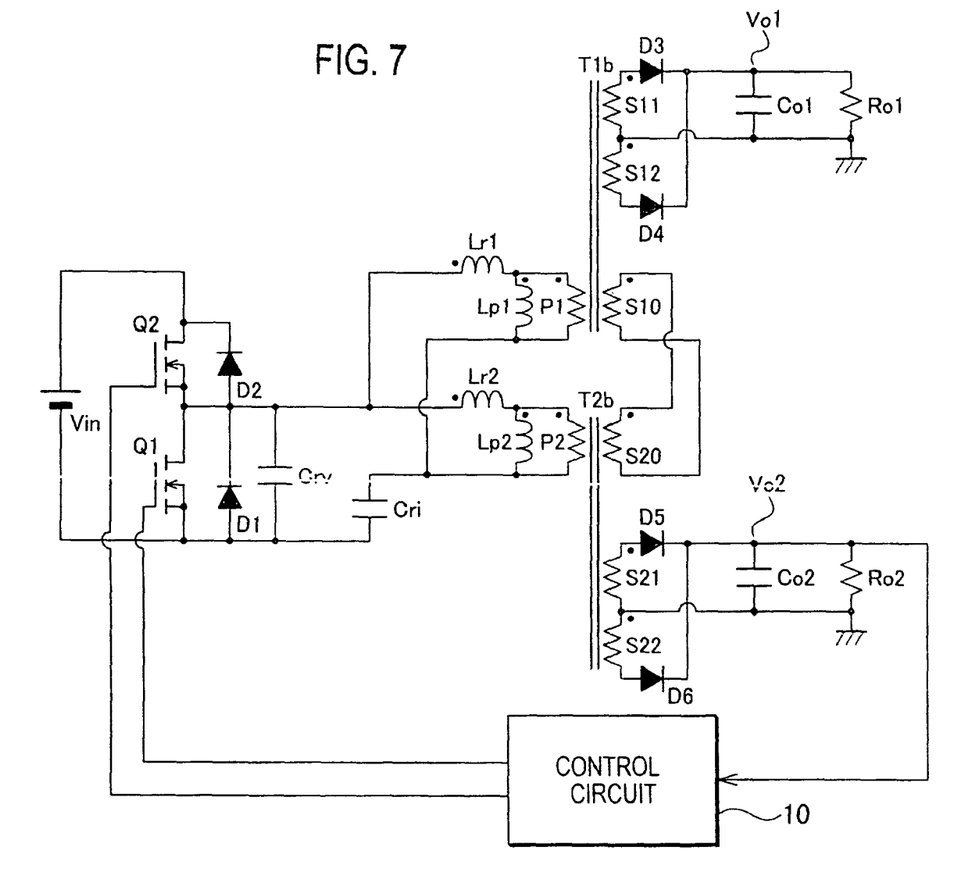
FIG. 7 is a circuit diagram illustrating a DC conversion apparatus according to Embodiment 3 of the present invention.

FIG. 7 is a circuit diagram illustrating a DC conversion apparatus according to Embodiment 3 of the present invention. Compared with the DC conversion apparatus of Embodiment 1 illustrated in FIG. 5, the present embodiment as illustrated in FIG. 7 employs exclusive-use secondary windings S10 and S20 for coupling transformers T1b and T2b. The other parts of FIG. 7 are the same as those of the DC conversion apparatus of Embodiment 1 illustrated in FIG. 5, and therefore, the same parts are represented with the same reference marks.

The transformer T1b has the secondary winding (second secondary winding) S10 instead of the secondary windings S13 and S14 of the transformer T1a illustrated in FIG. 5. The transformer T2b has the secondary winding S20 (second secondary winding) in addition to the configuration of the transformer T2 illustrated in FIG. 5. A first end of the secondary winding S10 as depicted by a filled circle is connected to a first end (with a filled circle) of the secondary winding S20. A second end of the secondary winding S10 is connected to a second end of the secondary winding S20.

In this way, the second secondary winding S10 of the transformer T1b and the second secondary winding S20 of the transformer T2b are connected in parallel, to provide the same effect as that provided by the DC conversion apparatus of Embodiment 1.

Embodiment 4

Figure 8:
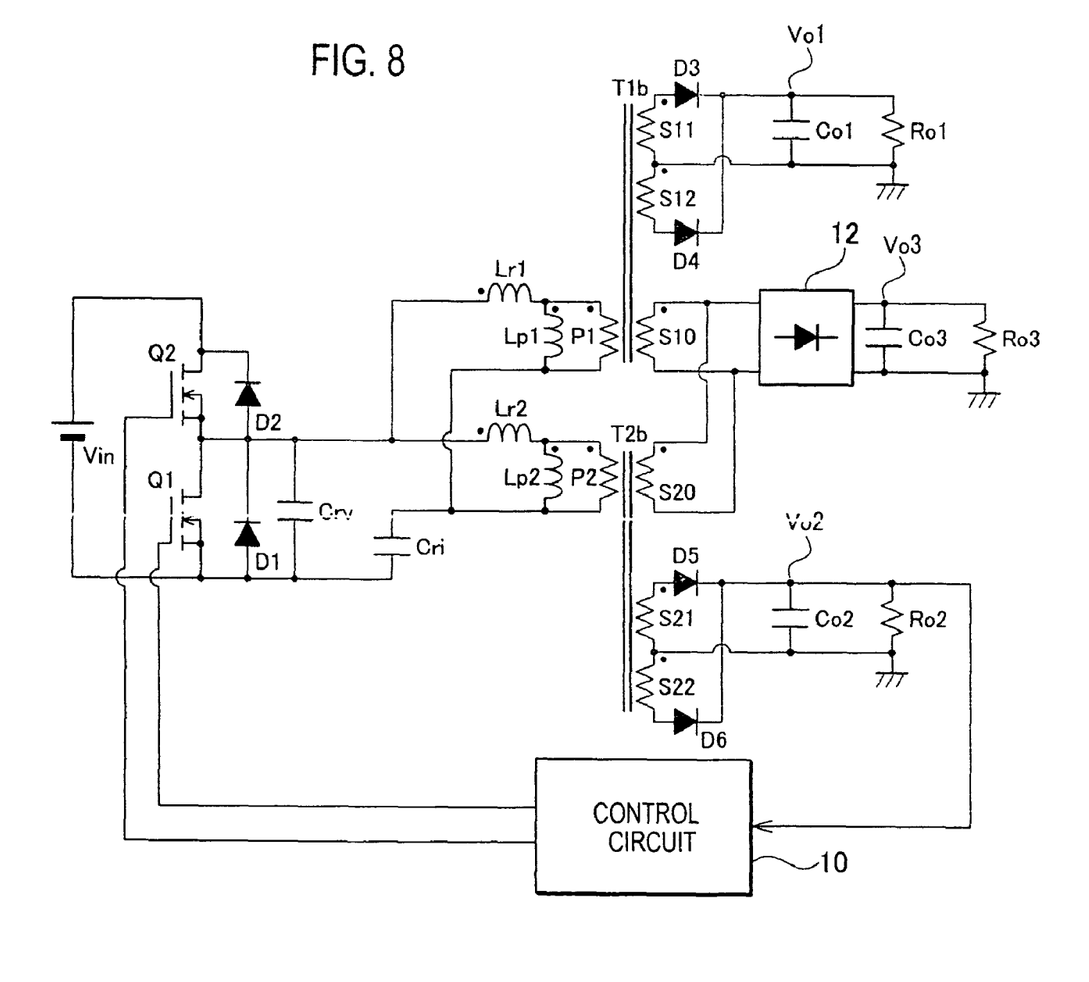
FIG. 8 is a circuit diagram illustrating a DC conversion apparatus according to Embodiment 4 of the present invention.

FIG. 8 is a circuit diagram illustrating a DC conversion apparatus according to Embodiment 4 of the present invention. Compared with the DC conversion apparatus of Embodiment 3 illustrated in FIG. 7, the DC conversion apparatus of the present embodiment as illustrated in FIG. 8 connects a rectifying-smoothing circuit to each end of a secondary winding S10 of a transformer T1b, to provide an output.

This rectifying-smoothing circuit consists of a rectifying circuit 12 and a capacitor Co3, to rectify and smooth a voltage generated by the secondary winding S10 into a third DC output Vo3 supplied to a load Ro3. The other parts illustrated in FIG. 8 are the same as those of the DC conversion apparatus of Embodiment 1 illustrated in FIG. 5, and therefore, the same parts are represented with the same reference marks.

The above-mentioned configuration achieves the effect of Embodiment 1 and is capable of providing three outputs, i.e., the first to third DC outputs Vo1 to Vo3.

Embodiment 5

Figure 9:
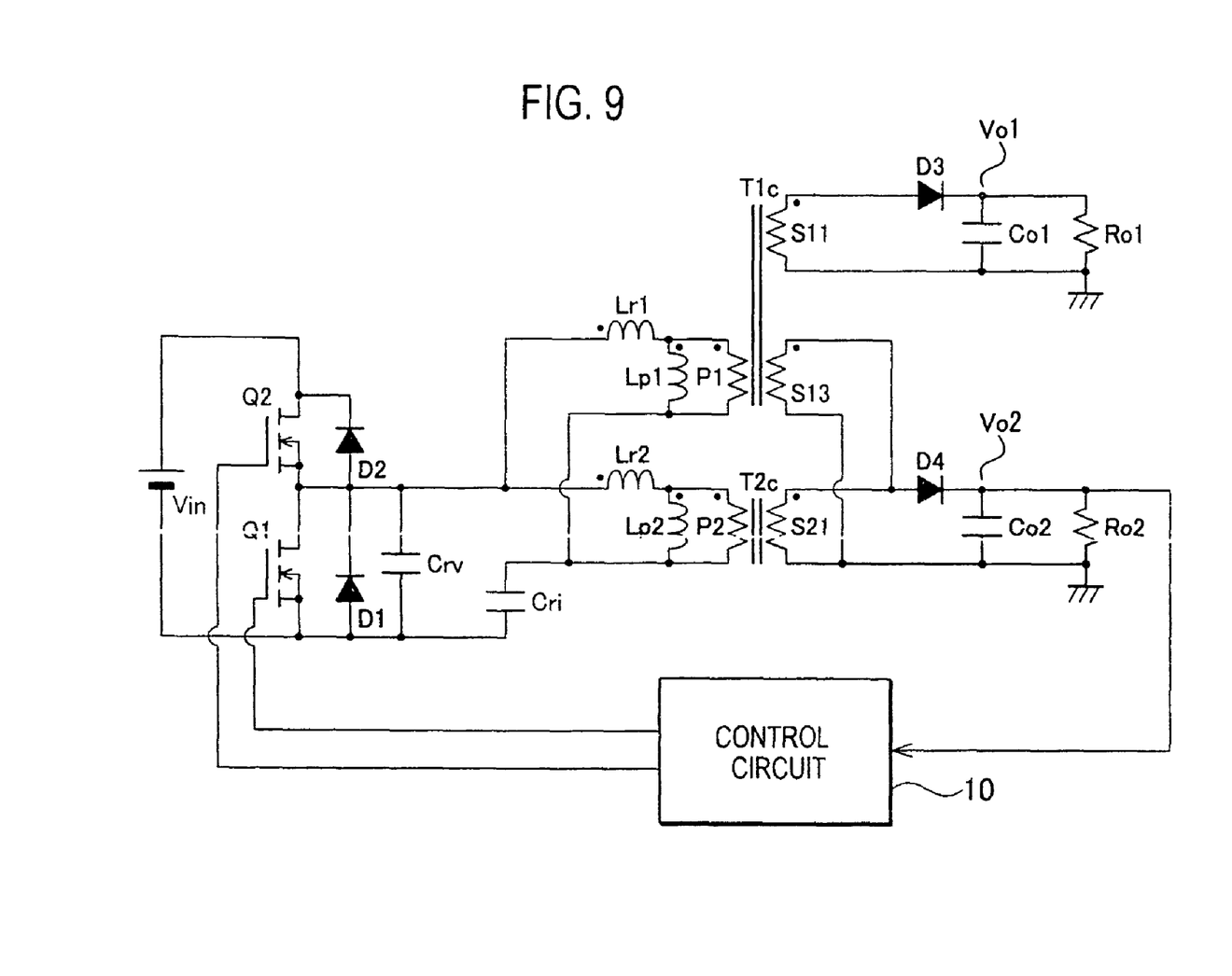
FIG. 9 is a circuit diagram illustrating a DC conversion apparatus according to Embodiment 5 of the present invention.

FIG. 9 is a circuit diagram illustrating a DC conversion apparatus according to Embodiment 5 of the present invention. The DC conversion apparatus of Embodiment 1 illustrated in FIG. 5 employs a full-wave rectifying and smoothing circuit configuration. On the other hand, the DC conversion apparatus of the present embodiment as illustrated in FIG. 9 employs a half-wave rectifying and smoothing circuit configuration.

Namely, a transformer T1c has a primary winding P1, a first secondary winding S11, and a second secondary winding S13. A transformer T2c has a primary winding P2 and a first secondary winding S21. Ends of the first secondary winding S1 are connected to a series circuit including a diode D3 and a capacitor Co1. Ends of the capacitor Co1 are connected to a load Ro1. Ends of the first secondary winding S21 are connected to a series circuit including a diode D4 and a capacitor Co2. Ends of the capacitor Co2 are connected to a load Ro2. The second secondary winding S13 of the transformer T1c and the first secondary winding S21 of the transformer 2c are connected in parallel.

The above-mentioned configuration provides the effect of Embodiment 1, simplifies the circuit, and only when a switching element Q2 is ON, the capacitors Co1 and Co2 provide half-wave-rectified DC output voltages.

Embodiment 6

Figure 10:
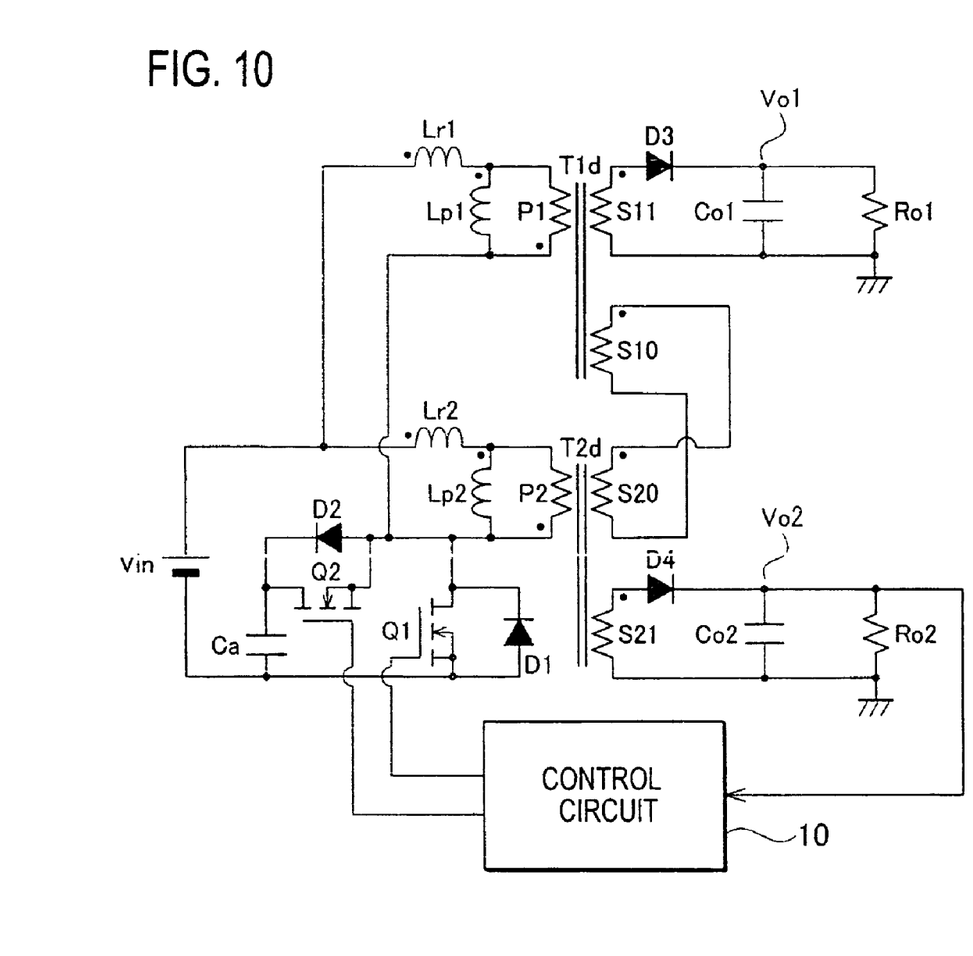
FIG. 10 is a circuit diagram illustrating, a DC conversion apparatus according to Embodiment 6 of the present invention.

FIG. 10 is a circuit diagram illustrating a DC conversion apparatus according to Embodiment 6 of the present invention. The DC conversion apparatus illustrated in FIG. 10 consists of an active clamp circuit and ends of a DC power source Mm are connected to a series circuit including a reactor Lr1, a primary winding; P1, and a switching element Q1. A series circuit of the reactor Lr1 and primary winding P1 is connected in parallel with a series circuit including a reactor Lr2 and a primary winding P2. Connected between the drain and source of the switching element Q1 is a series circuit including a switching element Q2 and a capacitor (clamp capacitor) Ca. Although one end of the capacitor Ca is connected to a negative electrode of the DC power source Mm, it may be corrected to a positive electrode thereof.

Between the drain and source of the switching element Q1, a diode D1 is connected in parallel. Between the drain and source of the switching element Q2, a diode D2 is connected in parallel.

A transformer T1d has the primary winding P1, a first secondary winding S81, and a second secondary winding S10. A transformer T2d has the primary winding P2, a first secondary winding S21, and a second secondary winding S20. A first end of the first secondary winding S11 of the transformer T1d as depicted by a filled circle is connected to an anode of a diode D3 and a second end of the first secondary winding S11 of the transformer T1d is connected to a first end of a smoothing capacitor Co1. A cathode of the diode D3 is connected to a second end of the capacitor Co1. The ends of the capacitor Co1 are connected to a load Ro1.

A first end (with a filled circle) of the second secondary winding S10 is connected to a first end (with a filled circle) of the second secondary winding S20 of the transformer T2d and a second end of the second secondary winding S10 is connected to a second end of the second secondary winding S20. A first end (with a filled circle) of the first secondary winding S21 of the transformer T2d is connected to an anode of a diode D4 and a second end of the first secondary winding S21 of the transformer T2d is connected to a first end of a smoothing capacitor Co2. A cathode of the diode D4 is connected to a second end of the capacitor Co2. The ends of the capacitor Co2 are connected to a load Ro2.

In this way, the second secondary winding S10 of the transformer T1d and the second secondary winding S20 of the transformer T2d are connected in parallel, to provide the same effect as that provided by the DC conversion apparatus of Embodiment 1.

The present invention is not limited to the DC conversion apparatuses of Embodiments 1 to 6. For example, the secondary-side configuration of the DC conversion apparatus of Embodiment 3 illustrated in FIG. 7 or Embodiment 4 illustrated in FIG. 8 may be replaced with the configuration including the secondary windings and half-wave rectifying-smoothing circuits of the DC conversion apparatus according to Embodiment 5 illustrated in FIG. 9. Similarly, the secondary-side configuration of the DC conversion apparatus of Embodiment 6 illustrated in FIG. 10 may be replaced with the configuration including the secondary windings and full-wave rectifying-smoothing circuits of the DC conversion apparatus of any one of Embodiments 1 to 4 illustrated in FIGS. 5 to 8.

Effect of Invention

According to the first technical aspect of the present invention, the first series circuit including the primary winding of the first transformer and the first reactor and the second series circuit including the primary winding of the second transformer and the second reactor are connected in parallel. Also, the second secondary winding of the first transformer and the first secondary winding of the second transformer are connected in parallel. The parallel-connected secondary windings provide a constant voltage and the first secondary winding of the first transformer and the first secondary winding of the second transformer provide voltages proportional to turn ratios of the secondary windings of the respective transformers. Voltages of the parallel-connected secondary windings are coupled together, and therefore, the voltage of each transformer is precisely provided according to a turn ratio. The secondary winding of each transformer is connected to the rectifying-smoothing circuit to realize a multiple-output power source circuit capable of including a low-voltage output with a single converter. The DC conversion apparatus of the first technical aspect is small, inexpensive, and highly efficient.

According to the second technical aspect of the present invention, the first series circuit including the primary winding of the first transformer and the first reactor and the second series circuit including the primary winding of the second transformer and the second reactor are connected in parallel. Also, the second secondary winding of the first transformer and the second secondary winding of the second transformer are connected in parallel. The parallel-connected secondary windings provide a constant voltage and the first secondary winding of the first transformer and the first secondary winding of the second transformer provide voltages proportional to turn ratios of the secondary windings of the respective transformers. Voltages of the parallel-connected secondary windings are coupled together, and therefore, the voltage of each transformer is precisely provided according to a turn ratio. Consequently, the second technical aspect achieves an effect similar to that achieved by the first technical aspect.

INDUSTRIAL APPLICABILITY

The present invention is applicable to DC-DC converting power source circuits and AC-DC converting power source circuits.

(United States Designation)

In connection with United States designation, this application claims benefit of priority under 35USC §119 to Japanese Patent Application No. 2007-036527 filed on Feb. 16, 2007, the entire content of which is incorporated by reference herein.

The invention claimed is:

1. A DC conversion apparatus comprising:
a first transformer at least having a primary winding, a first secondary winding, and a second secondary winding;
a second transformer at least having a primary winding and a first secondary winding;
a parallel circuit having first and second series circuits connected in parallel, the first series circuit including a first reactor and the primary winding of the first transformer that are connected in series, the second series circuit including a second reactor and the primary winding of the second transformer that are connected in series;
a conversion circuit configured to convert a DC voltage of a DC power source into an AC voltage and output the AC voltage to the parallel circuit;
a first rectifying-smoothing circuit configured to rectify and smooth a first voltage generated by the first secondary winding of the first transformer into a first DC output; and
a second rectifying-smoothing circuit configured to rectify and smooth a second voltage generated by the first secondary winding of the second transformer into a second DC output, the second voltage being different from the first voltage, wherein
the second secondary winding of the first transformer is directly connected in parallel with the first secondary winding of the second transformer, thereby the first secondary winding of the first transformer and the first secondary winding of the second transformer are magnetically coupled to each other through the second secondary winding of the first transformer.

2. A DC conversion apparatus comprising:
a first transformer at least having a primary winding, a first secondary winding, and a second secondary winding;
a second transformer at least having a primary winding, a first secondary winding, and a second secondary winding;
a parallel circuit having first and second series circuits connected in parallel, the first series circuit including a first reactor and the primary winding of the first transformer that are connected in series, the second series circuit including a second reactor and the primary winding of the second transformer that are connected in series;
a conversion circuit configured to convert a DC voltage of a DC power source into an AC voltage and output the AC voltage to the parallel circuit;
a first rectifying-smoothing circuit configured to rectify and smooth a first voltage generated by the first secondary winding of the first transformer into a first DC output; and
a second rectifying-smoothing circuit configured to rectify and smooth a second voltage generated by the first secondary winding of the second transformer into a second DC output, the second voltage being different from the first voltage, wherein
the second secondary winding of the first transformer is directly connected in parallel with the second secondary winding of the second transformer, thereby the first secondary winding of the first transformer and the first secondary winding of the second transformer are magnetically coupled to each other through the second secondary winding of the first transformer and the second secondary winding of the second transformer.

3. The DC conversion apparatus of claim 1, wherein the first reactor comprises a leakage inductance of the first transformer and the second reactor comprises a leakage inductance of the second transformer.

4. The DC conversion apparatus of claim 2, wherein the first reactor comprises a leakage inductance of the first transformer and the second reactor comprises a leakage inductance of the second transformer.

5. The DC conversion apparatus of claim 1, wherein the conversion circuit comprises:
a first switching element having a first end connected to a negative electrode of the DC power source; and
a second switching element having a first end connected to a second end of the first switching element and a second end connected to a positive electrode of the DC power source, wherein
the conversion circuit alternately turns on/off the first and second switching elements configured to convert a DC voltage of the DC power source into an AC voltage and outputs the AC voltage to the parallel circuit through a current resonant capacitor connected to the first end of the first switching element, the second end of the second switching element, or a connection point of the first and second switching elements.

6. The DC conversion apparatus of claim 2, wherein the conversion circuit comprises:
 a first switching element having a first end connected to a negative electrode of the DC power source; and
 a second switching element having a first end connected to a second end of the first switching element and a second end connected to a positive electrode of the DC power source, wherein
 the conversion circuit alternately turns on/off the first and second switching elements configured to convert a DC voltage of the DC power source into an AC voltage and outputs the AC voltage to the parallel circuit through a current resonant capacitor connected to the first end of the first switching element, the second end of the second switching element, or a connection point of the first and second switching elements.

7. The DC conversion apparatus of claim 1, wherein the conversion circuit comprises:
 a first switching element having a first end connected to a negative electrode of the DC power source; and
 a second switching element having a first end connected to a second end of the first switching element and a second end connected through a clamp capacitor to the negative or positive electrode of the DC power source, wherein
 the conversion circuit alternately turns on/off the first and second switching elements configured to convert a DC voltage of the DC power source into an AC voltage and outputs the AC voltage to the parallel circuit.

8. The DC conversion apparatus of claim 2, wherein the conversion circuit comprises:
 a first switching element having a first end connected to a negative electrode of the DC power source; and
 a second switching element having a first end connected to a second end of the first switching element and a second end connected through a clamp capacitor to the negative or positive electrode of the DC power source, wherein
 the conversion circuit alternately turns on/off the first and second switching elements configured to convert a DC voltage of the DC power source into an AC voltage and outputs the AC voltage to the parallel circuit.

9. The DC conversion apparatus of claim 1, wherein the first and second rectifying-smoothing circuits have each a rectifying diode and a smoothing capacitor, to full-wave or half-wave rectify and smooth the first and second voltages into the first and second DC outputs.

10. The DC conversion apparatus of claim 2, wherein the first and second rectifying-smoothing circuits have each a rectifying diode and a smoothing capacitor, to full-wave or half-wave rectify and smooth the first and second voltages into the first and second DC outputs.

\* \* \* \* \*